United States Patent [19]

Hucker et al.

[11] 4,139,780
[45] Feb. 13, 1979

[54] MULTI-CHANNEL GENERATOR DRIVE SYSTEM

[75] Inventors: David J. Hucker; Timothy F. Glennon, both of Rockford, Ill.

[73] Assignee: Sundstrand Corporation, Rockford, Ill.

[21] Appl. No.: 853,232

[22] Filed: Nov. 17, 1977

[51] Int. Cl.² .............................................. H02J 4/00
[52] U.S. Cl. .......................................... 307/86; 290/8
[58] Field of Search ....................... 307/43, 85, 86, 84, 307/87, 130, 129, 131; 290/4 R, 4 A, 7, 8; 324/174

[56] References Cited

U.S. PATENT DOCUMENTS

| 3,560,854 | 2/1971 | Moss et al. | 324/174 |
| 3,576,143 | 4/1971 | Baits | 74/687 |

Primary Examiner—Robert K. Schaffer
Assistant Examiner—Morris Ginsburg
Attorney, Agent, or Firm—Wegner, Stellman, McCord, Wiles & Wood

[57] ABSTRACT

A multi-channel generating system wherein each channel is provided with a permanent magnet generator (PMG) coupled directly to the output of a constant speed drive. An overrunning clutch is located between the PMG and the generator. The frequency of the signal from the PMG is proportional to the output speed of the constant speed drive. A circuit provides underspeed information if the speed, as indicated by the PMG, drops below a minimum speed represented by a reference voltage. The underspeed information controls the excitation and de-excitation of the generator exciter voltage and a line contactor switch.

7 Claims, 5 Drawing Figures

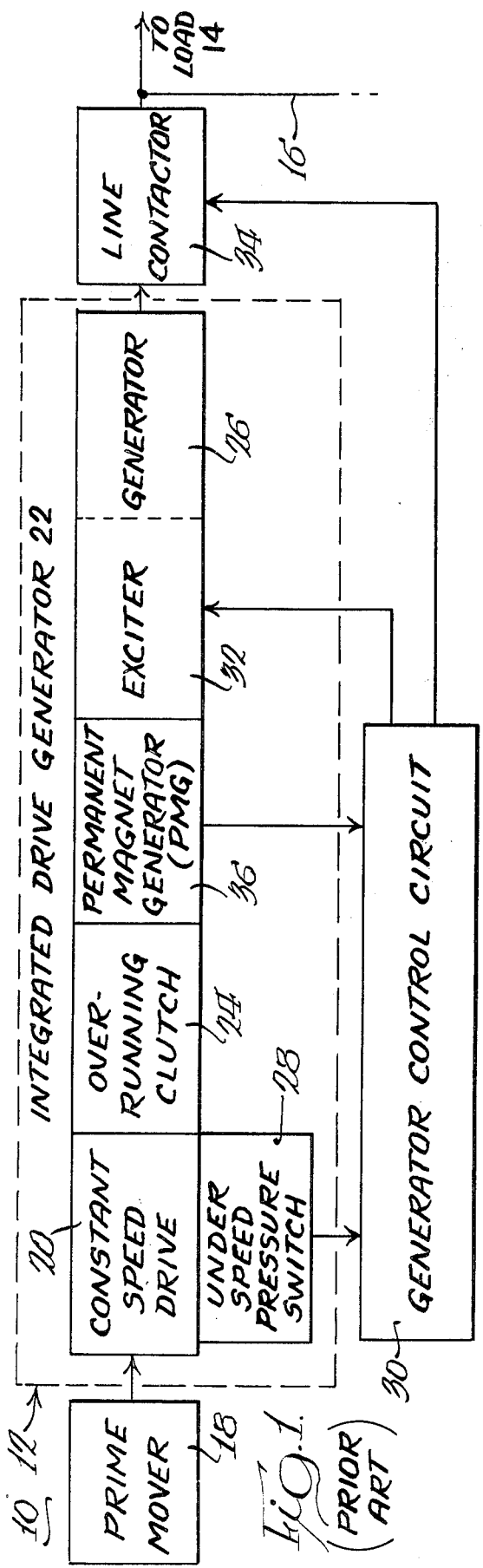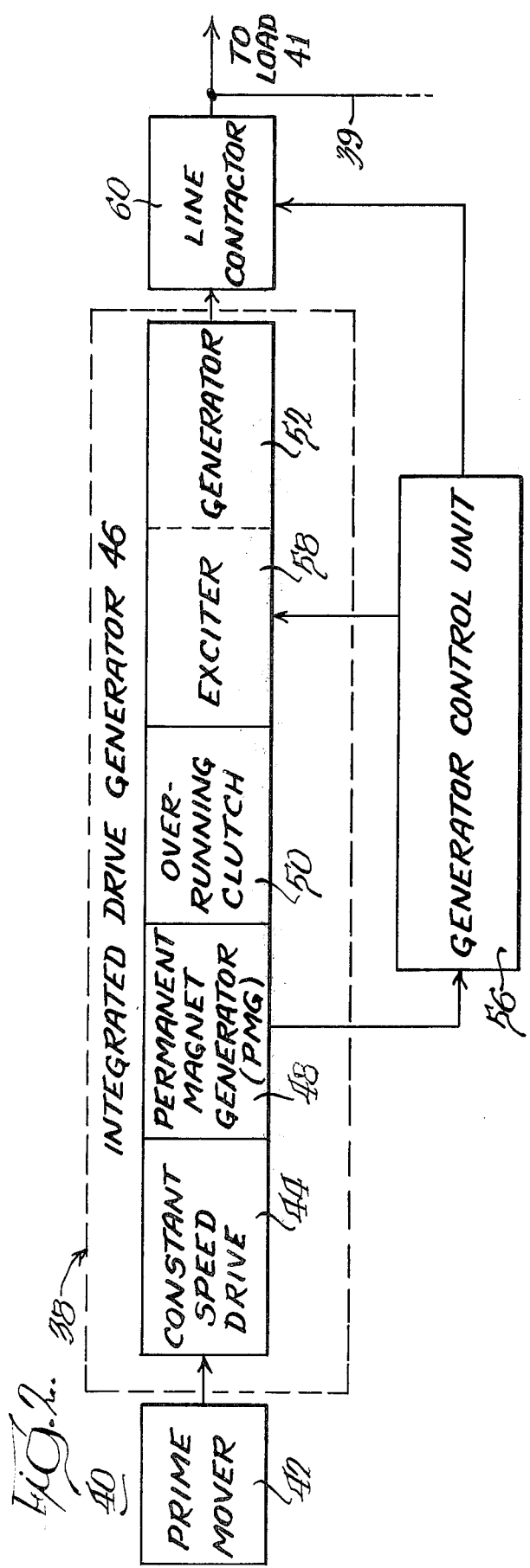

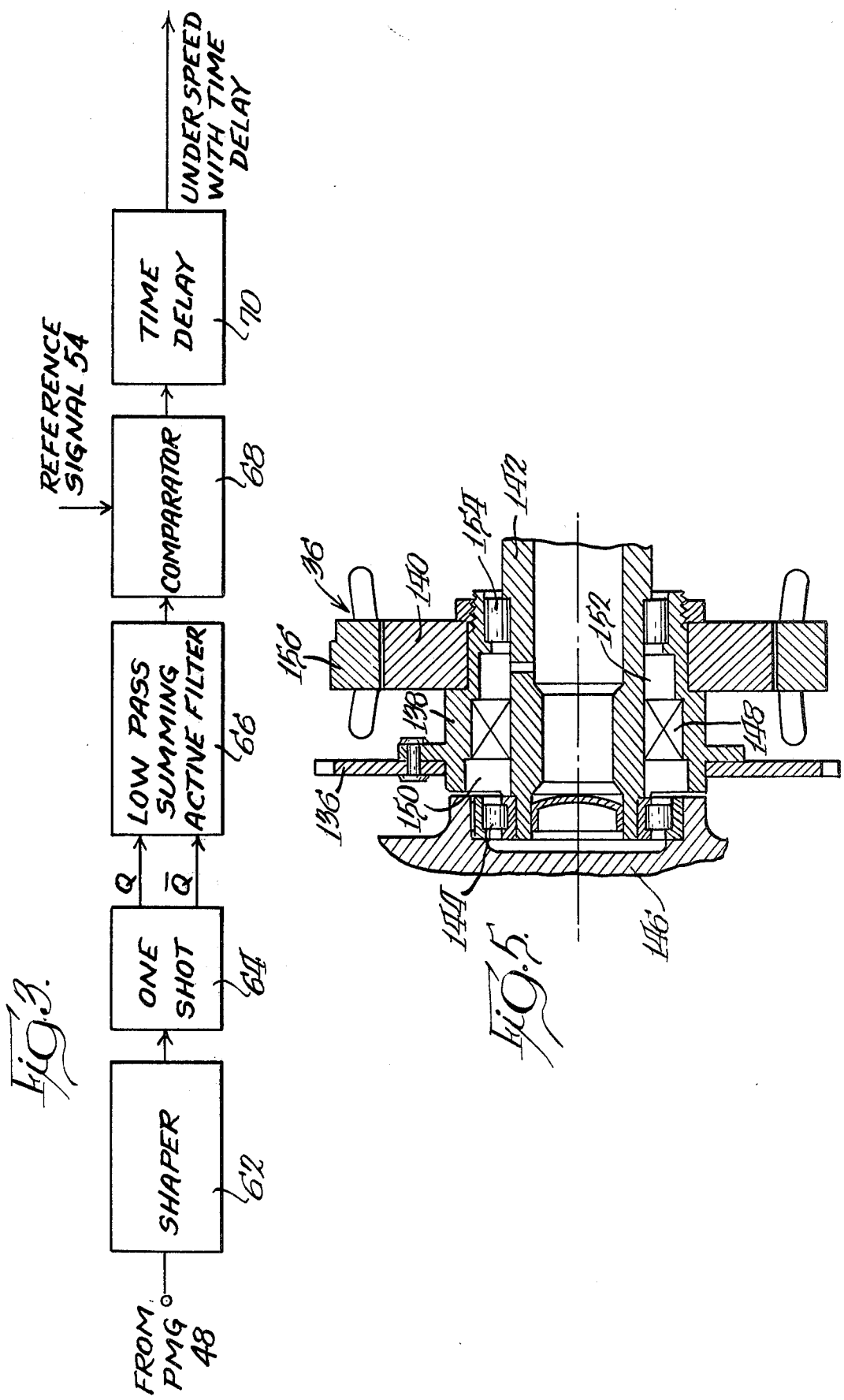

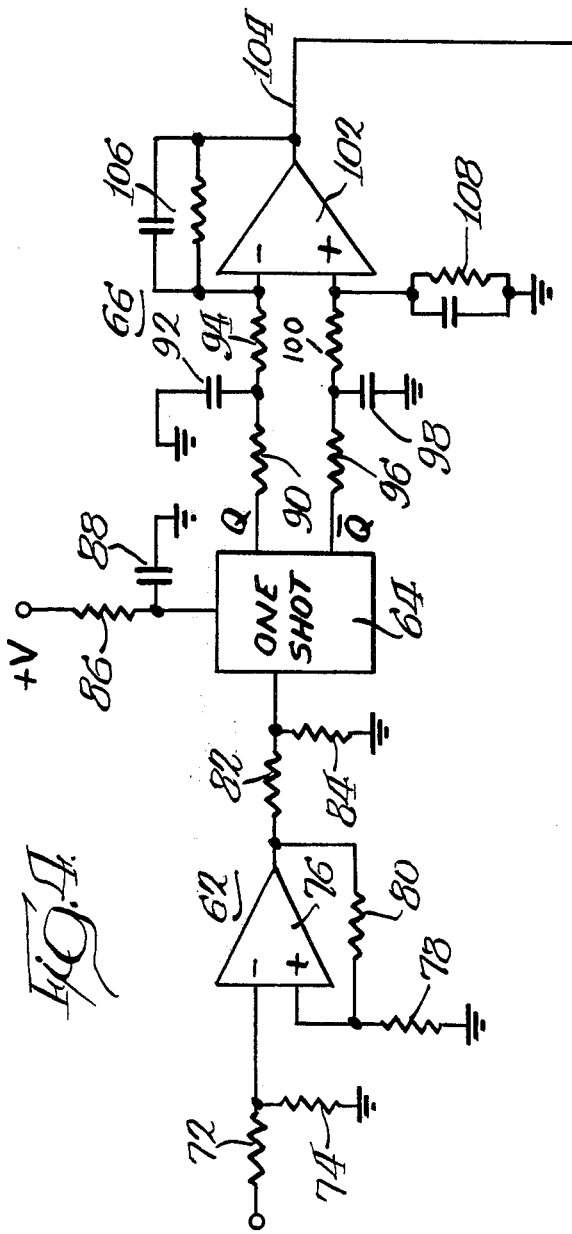

MULTI-CHANNEL GENERATOR DRIVE SYSTEM

BACKGROUND OF THE INVENTION

This invention relates to multi-channel generating systems and, more particularly, to a system having improved circuitry for detecting an underspeed condition.

Generators may be coupled in parallel to multi-channel operation to provide current to a load. For example, in a four-engine aircraft, four-channel operation is provided, each engine being a prime mover for one channel. When a prime mover for one channel is shut down, the rotor of the generator tends to motor the prime mover. This is undesirable and results from a voltage impressed on the stator of the shut-down channel by the other operating channels. An overrunning clutch has been coupled between the output of the constant speed drive and the rotor of the generator portion of a generator. For example, see Baits U.S. Pat. No. 3,576,143, which shows an integrated constant speed drive generator having an overrunning clutch which slips as the speed of the prime mover decreases below minimum speed. Simultaneously, the drive charge pressure between the constant speed drive section of the system and the rotor of the generator section decreases, until an underspeed pressure switch is actuated. The switch provides a signal to the generator control unit to remove the excitation voltage from the exciter of the generator and to open the line contactor, thereby electrically disconnecting that channel from the multi-channel system. The generator control unit receives power from a permanent magnet generator (PMG) mounted on the rotor of the generator.

It is desirable to eliminate the underspeed pressure switch from the constant speed drive for a number of reasons. The first is that since the underspeed switch is physically located near the prime mover and the generator control may be in a remote location, the elimination of the switche eliminates a significant amount of copper conductor. In a four-engine commercial aircraft, for example, approximately 1,000 feet of interconnecting wire is eliminated.

We have developed an improved integrated constant speed drive generator for use in a multi-channel generating system which does not require the use of an underspeed pressure switch, thereby minimizing the use of interconnecting wire within the system and reducing the number of parts in the system.

SUMMARY OF THE INVENTION

A multi-channel generating system supplies current to a load. The channels are electrically connected in parallel and are of similar construction. Each channel has a prime mover which drives a constant speed drive which, in turn, drives a generator. During shutdown, an overrunning clutch, interposed between the output of the constant speed drive and the generator, slips to mechanically disconnect the rotor of the generator from the constant speed drive section. A permanent magnet generator (PMG) coupled directly to the output of the constant speed drive provides a signal having a frequency proportional to the speed of the constant speed drive. The signal from the PMG is provided to a generator control unit and there it is compared to a signal representative of a speed equal to a minimum desirable speed. When the speed of the constant speed drive decreases to less than minimum desired speed, the generator control unit electrically disconnects the shut-down channel from the multi-channel system and disconnects the excitation voltage provided to the generator. The circuit is unaffected by false signals, as short transient disturbances.

A feature of the present invention is to provide a multi-channel generating system wherein each channel has a constant speed drive not having an underspeed pressure switch, yet capable of providing underspeed information.

A further feature of the present invention is to provide a multi-channel generating system wherein each channel has a PMG connected to the output of the constant speed drive which controls the excitation of the generator and the line contactor in a multi-channel generating system.

Another feature of the present invention is to provide an integrated constant speed generator having a PMG coupled directly to the output of the constant speed generator portion thereof which provides speed information to a circuit that detects an underspeed condition.

Other features will become apparent when considering the following specification in combination with the drawing in which:

DRAWING

FIG. 1 is a block diagram of a single channel of a multi-channel generating system known to the prior art;

FIG. 2 is a block diagram of a single channel of the improved multi-channel generating system;

FIG. 3 is a block diagram of the circuit which provides underspeed information;

FIG. 4 is a schematic diagram of the circuit shown in FIG. 3; and

FIG. 5 is a cross-sectional view of the permanent magnet generator (PMG) mounted on the integrated constant speed generator, a rotor of a generator and an overrunning clutch therebetween.

DESCRIPTION OF PREFERRED EMBODIMENT

Referring to FIG. 1, a single channel of a prior art multi-channel system 10 is shown. Single channel 12 provides power to load 14, and additional similarly constructed channels (not shown) are connected to bus 16. Since all the channels of the multi-channel system 10 are similar, only channel 12 will be described. Prime mover 18 is mechanically coupled to the input of a constant speed drive as, for example, constant speed drive section 20 of an integrated drive generator 22. The integrated drive generator 22 may be of the type disclosed in Baits U.S. Pat. No. 3,576,143. The constant speed drive 20 is coupled through an overrunning clutch 24 to a generator 26. An underspeed pressure switch 28, responsive to the output speed of the constant speed drive 20, provides a signal to generator control unit 30. Generator control unit 30 receives its power from PMG 36. The underspeed pressure switch is an ON/OFF switch which responds to the pressure in the constant speed drive.

During start-up of prime mover 18, the output speed of the constant speed drive increases, and the pressure in the constant speed drive increases in proportion to the increase in speed. When a minimum speed is reached, a flyball governor stem moves, generating a hydraulic signal which causes the underspeed pressure switch 28 to close, providing information to generator control unit 30. Generator control unit 30 controls the voltage to exciter 32 of generator 26, as well as the open/closed position of line contactor 34 when the output speed of the constant speed drive is greater than the minimum speed.

Generator control unit 30, responsive to underspeed pressure switch 28, opens line contactor 34 if the output of the constant speed drive fails or decreases in angular velocity to a point lower than the minimum angular velocity necessary for proper generator operation. During shutdown of prime mover 18, generator control unit 30 maintains line contactor 34 closed and power to exciter 32 until the output speed of the constant speed drive 20 has dropped below minimum speed, as detected by underspeed pressure switch 28.

PMG 36 is coupled to the shaft of generator 26 (see Baits, FIG. 1, where PMG, not labeled, is on the left end of rotor 54 adjacent bearing 56). Frequency information from the PMG has been used to detect a speed condition of generator 26 although it has not been so used in a multi-channel generating system, as illustrated in FIG. 1.

Referring to FIG. 2, a single channel 38 of the improved multi-channel generating system 40 will now be described, it being understood that the other channels are of similar construction and connected to load bus 39, providing power to load 41.

Prime mover 42 is mechanically coupled to a constant speed drive as, for example, a constant speed drive 44 of integrated drive generator 46. PMG 48 is coupled directly to the output of the constant speed drive 44. The signal from the PMG provides speed information of the output of the constant speed drive. The frequency of the signal from PMG 48 is directly proportional to the speed of the constant speed drive. Overrunning clutch 50 is coupled between PMG 48 and the shaft of generator 52 and exciter 58.

During start-up, the constant speed drive 44 exceeds a level greater than minimum speed, and this condition is detected by PMG 48. A circuit in generator control unit 56 detects the minimum speed condition and provides a voltage to exciter 58 and closes line contactor 60.

When prime mover 42 shuts down and the speed from constant speed drive 44 drops below the minimum speed, overrunning clutch 50 slips. Generator control unit 56 compares the frequency of the PMG signal with a signal representing a reference frequency (as described below) and when the signal from PMG 48 indicates an underspeed condition, generator control unit 56 causes exciter 58 to become de-excited and line contactor 60 to open, thereby disconnecting the channel from the system.

Referring to FIG. 3, a block diagram of the circuit within generator control unit 56 which detects an underspeed condition is shown. The output from the PMG is a sinusoidal waveform, the frequency of which is proportional to the angular velocity of the output of the constant speed drive. The signal from PMG 48 is provided to shaper 62 to square up and make more uniform the sinusoidal input signal. The output of shaper 62 is applied to one-shot circuit 64. One-shot circuit 64 provides a pulse on output Q and an inverted pulse on output $\overline{Q}$ each time a pulse is received from shaper 62. The width of pulses from Q must be equal to or smaller than the width of the pulses received from shaper 62. Therefore, the repetition rate of the pulses from one-shot 64 is proportional to the frequency of the output speed of the constant speed drive. As the repetition rate increases, the length of $\overline{Q}$ becomes shorter, and when the pulse length of Q equals the pulse length of $\overline{Q}$, the system operates at what hereinafter is referred to as the set point. The set point represents operation at a desired frequency (e.g. 400Hz), and may be changed by adjusting the width of the pulse from one-shot 64. The outputs Q and $\overline{Q}$ from one-shot 64 are applied to the differential inputs of a low pass summing active filter 66. The output of low pass summing active filter 66 is a voltage, the amplitude being directly proportional to the frequency error from the set point.

A reference voltage, representing the desired minimum speed, as a speed equal to 95% of synchronous speed is compared to the voltage from the summing active filter 66 by comparator 68. An underspeed condition exists when the voltage from the summing active filter 66 is less than the reference signal. An output is provided from time delay circuit 70 if an underspeed condition from comparator 68 has lasted for a preset period of time. The time delay circuit 70 permits the system to be unaffected by short transient disturbances. The length of the time delay is operator-selectable and must accommodate the longest duration the speed will be outside the trip range. This length of time is typically 0.5 to 2 seconds.

Referring to FIG. 4, a detailed description of the block diagram shown in FIG. 3 will now be provided. The signal from the PMG 48 is applied to shaper 62 through resistors 72 and 74. The negative input terminal of op amp 76 is connected between resistors 72 and 74 and the voltage applied thereto is proportional to the input voltage from PMG 48. The positive input terminal of op amp 76 is connected to grounded resistor 78 and to the output of op amp 76 through resistor 80. The hysteresis of op amp 76 is determined by the appropriate selection of resistors 78 and 80. The output of operational amplifier 76 is provided to a voltage divider consisting of resistors 82 and 84.

The input of one-shot 64 is connected between resistors 82 and 84. The output of one-shot 64 is a pulse, the width of which is determined by the appropriate selection of resistor 86 and capacitor 88. The pulse repetition rate on the outputs Q and $\overline{Q}$ of one-shot 64 is the same as the frequency of the signal from pulse shaper 62.

The signals Q and $\overline{Q}$ are provided to active low pass filter 66. The differential transmission of the Q and $\overline{Q}$ signals assures the elimination of common mode noise and reduces the effect of the power supply at the set point. Resistor 90 and capacitor 92 form a simple lag network to filter the pulses from Q output of one-shot 64 to provide a voltage across resistor 94. Similarly, resistor 96 and capacitor 98 form a lag network to filter the signal from $\overline{Q}$ of one-shot 64, providing a voltage across resistor 100. Resistor 94 is coupled to the negative input of operational amplifier 102 and resistor 100 is coupled to the positive input of operational amplifier 102. The difference between the voltage at the negative and positive inputs to the operational amplifier 102 is amplified to provide an output on line 104. The amplitude of the voltage on line 104 is proportional to the error from the set point. Matched resistor and capacitor networks 106 and 108 filter the signals at the negative and positive input terminals, respectively, of operational amplifier 102.

The voltage from the active low pass filter 66 is provided to the negative input of operational amplifier 110 through resistor 112 of comparator 68. Resistors 114, 116 and 118, coupled to a positive voltage V, form a voltage divider which establishes the reference signal to which the voltage from active low pass filter 66 is compared. When the operation of the system is not indicative of an underspeed condition, the voltage at the positive input terminal of operational amplifier 110 exceeds the voltage at its negative input terminal. Under this condition, an output voltage is provided from operational amplifier 110. An underspeed condition is detected when the voltage at the negative input terminal of operational amplifier 110 exceeds the voltage at the positive input terminal, there being no output voltage from operational amplifier 110 in this situation.

Time delay circuit 70 assures that the system will be unaffected by short transient disturbances resulting from the output of operational amplifier 110 being low or off for a short period of time. Specifically, the output of amplifier 110 is coupled to transistor 120 through biasing resistors 122 and 124. As stated previously, during normal operation, the output of operational amplifier 110 will be positive. A positive voltage to the base of transistor 120 keeps it on, shorting capacitor 126 and the positive input of operational amplifier 128 to ground. Resistors 130 and 132, coupled to a voltage V, form a voltage divider network to provide a reference voltage at the negative input terminal of the operational amplifier 128. When the voltage at the positive input terminal of operational amplifier 128 exceeds that established by the voltage dividers 130 and 132, voltage is provided from output 134. This occurs when transistor 120 is off for a sufficient amount of time to permit the voltage across capacitor 126 to charge to +V through resistor 134, overcoming the voltage applied to the negative input of operational amplifier 128. The output from time delay circuit 70 is coupled to well-known circuitry within the generator control unit 56 to control the ON/OFF condition of exciter 58 and line contactor 60.

Referring to FIG. 5, a brief description of the placement of the overrunning clutch between the constant speed drive and the generator will now be provided.

The output of constant speed drive 44 drives gear 136 which is secured to sleeve 138. The main field winding 140 of PMG 36 is also secured to sleeve 138. Shaft 142 of the generator 52 is mounted at its left end by bearings 144 which are supported by housing 146. Overrunning clutch 148 couples sleeve 138 to shaft 142, and sleeve bearings 150, 152 and 154 are mounted to the sides of overrunning clutch 148. The output from PMG 36 is taken from windings 156.

We claim:

1. In a generating system having a plurality of channels, each channel having a constant speed drive coupled to a generator, the output of the generator coupled through a line contactor switch in parallel with the outputs of the generators of the other channels to provide current to a load, the improvement comprising:
    means connected to the constant speed drive for generating a signal proportional to the speed of the constant speed drive;
    means responsive to the signal for opening the line contactor switch if the speed of the output of the constant speed drive drops below a selected level; and
    overrunning clutch means coupled between the output of the constant speed drive and the generator for mechanically disconnecting the output of the constant speed drive from the generator if the output speed from the constant speed drive drops below the speed of the generator.

2. The generating system of claim 1 wherein each generator has an exciter provided with an excitation voltage and said means responsive to the signal for opening the line contactor switch also disconnects the excitation voltage if the output speed from the constant speed drive drops below the selected speed.

3. The generating system of claim 1 wherein the means for generating a signal proportional to the speed of the output of the constant speed drive includes:
    a permanent magnet generator.

4. The generating system of claim 1 wherein the means for opening the line contactor switch includes:
    a circuit for generating a voltage representative of the frequency of the signal;
    means for establishing a reference voltage proportional to the selected speed;
    means for comparing the voltage representative of the frequency to the reference voltage;
    means responsive to the comparing means for generating an underspeed signal if the speed from the constant speed drive is less than the speed from the reference speed; and
    means responsive to the underspeed signal for opening the line contactor switch.

5. The generating system of claim 4 further including time delay means for inhibiting the underspeed signal if it does not exist for a selected period of time.

6. In an integrated drive generator having a constant speed drive the input of which is adapted to be coupled to a prime mover and the output of which provides a selected constant speed and is coupled to a generator provided with an excitation voltage, the improvement comprising:
    means connected to the constant speed drive for generating a signal having a frequency proportional to the speed of the output of the constant speed drive;
    means responsive to the signal for disconnecting the excitation voltage from the generator if the output of the constant speed drive is less than a selected reference speed RPM; and
    overrunning clutch means coupled between the output of the constant speed drive and the generator for mechanically disconnecting the output of the constant speed drive from the generator if the RPM of the output of the constant speed drive becomes less than the selected constant speed.

7. In a multi-channel constant speed drive generating system, each channel including a prime mover coupled to the input of a constant speed drive, the output of the constant speed drive coupled to a generator through an overrunning clutch, a line contactor connected on the output of the generator, and a PMG, the improvement comprising:
    means for driving the PMG directly from the output of the constant speed drive to produce a PMG signal;
    means responsive to the PMG signal for detecting an underspeed condition; and
    means responsive to the underspeed condition for opening the line contactor.

* * * * *